Nov. 27, 1962     E. L. FAUST ETAL     3,065,800

POTATO DIGGING AND HARVESTING DEVICE

Filed June 20, 1960     2 Sheets-Sheet 1

INVENTORS.
Ellwood L. Faust and
Robert R. Harter
BY
Paul O. Pippel
Atty.

Nov. 27, 1962     E. L. FAUST ETAL     3,065,800
POTATO DIGGING AND HARVESTING DEVICE

Filed June 20, 1960     2 Sheets-Sheet 2

INVENTORS.
Ellwood L. Faust and
Robert R. Harter
BY
Paul O. Pippels
Atty.

3,065,800
POTATO DIGGING AND HARVESTING DEVICE
Ellwood L. Faust, Moline, Ill., and Robert R. Harter, Orlando, Fla., assignors to International Harvester Company, Chicago, Ill., a corporation of New Jersey
Filed June 20, 1960, Ser. No. 37,285
10 Claims. (Cl. 171—98)

This invention relates to agricultural implements, and particularly to diggers of root crops such as potatoes and the like. More specifically, the invention pertains to a device of this type which is adapted to dig two rows of potatoes, for instance, simultaneously.

A primary object of the invention is to provide a two row potato digger which will require much less power to operate it than is required by such devices heretofore known with consequent large savings in fuel consumption and engine wear.

Another significant object is to provide such a potato digger which can be used in all parts of the country, for instance, including stony terrain such as that found in northern Maine without getting stuck or breaking down, unlike the present blade or scoop type diggers.

Another important object is to provide a potato digger in which the earth is better separated from the potatoes for all soils and conditions thereof than in prior devices.

Another important object is to provide an implement of the above type in which the digging means comprises individual digger means for each row of potatoes unlike any known prior construction.

Still another important object is the provision of a device of the above type in which the individual digger means for each row is independently adjustable to the proper depth for withdrawing the potatoes without injury while yet not digging deeper than necessary with attendant wasting of power and fuel.

Another object of great importance is the provision of an implement of the above type in which the individual digger means are independently adjustable over a wide range in contrast to the very limited simultaneous adjustment provided by the only known prior construction having any adjustment at all.

Yet another object is to provide a device of the above type in which the digging means comprises digger elements which are automatically moved in turn by their digging engagement with the ground as the device is moved along the rows of crop without the need of special power means and controls.

It is well known that potatoes are an extremely fragile crop to harvest especially by mechanical means, the potatoes being very easily bruised which causes them to quickly turn black rendering them unsaleable. It is therefore another and most important object of this invention to provide a device for mechanically digging potatoes which will not so injure the crop. This is accomplished in the present invention by the use of digger means which turn over the earth as they cut through the respective rows placing the potatoes on or near the top with a cushioning blanket of earth below them for protection as they are moved over the ground towards the center between adjacent rows and as they are being moved onto the conveyor.

A further object of great importance is to provide a construction of the above type which is substantially simpler and lighter weight in overall structure and less expensive to purchase and maintain. This is in great measure accomplished by providing the crop handling portions of the present device as a compact unitary structure with a tractor, utilizing the wheels and moving support of the latter for elimination of many parts. This arrangement additionally provides for easier and better control by the operator as the crop handling parts are all underneath the tractor and readily observable. This arrangement further greatly shortens the length of the conventional tractor and drawn digger combination to greatly facilitate maneuvering, and also eliminates any problem of side swing, tipping or other effect of lack of stability.

A significant feature of the present invention is that by virtue of the digging means moving the potatoes or the like and the included earth toward the center from each side a conveyor of considerably reduced width can can be employed. Also, since a minimum of earth is removed, the conveyor need not be as long as in the prior devices. This of course contributes to a lighter and more inexpensive structure and to a conveyor which, because of the reduced width, can be adjusted and moved along between the rows more conveniently.

The reduced width of the conveyor also has another very important advantage which is to deposit the potatoes or the like on the ground behind the implement in a more concentrated fashion over a narrower belt or single windrow between the rows for easier gathering or the use of an indirect harvester.

A further feature of a preferred form of the invention is the provision of digger wheels which comprise peripheral, spaced, spade-like digger elements and spider web-like or open interior supporting structures which sift much of the dirt from the potatoes or the like and considerably reduce the amount of dirt to be handled and separated from the crop by the conveyor.

Still another feature of the aforesaid preferred form of the invention consists of convex interiors of the digger wheels in the direction of implement movement which prevent collection of the dirt and facilitate discharge therefrom.

Other objects, advantages, and features of the invention will become apparent from the following description when read with the accompanying drawing, in which.

Figure 1:
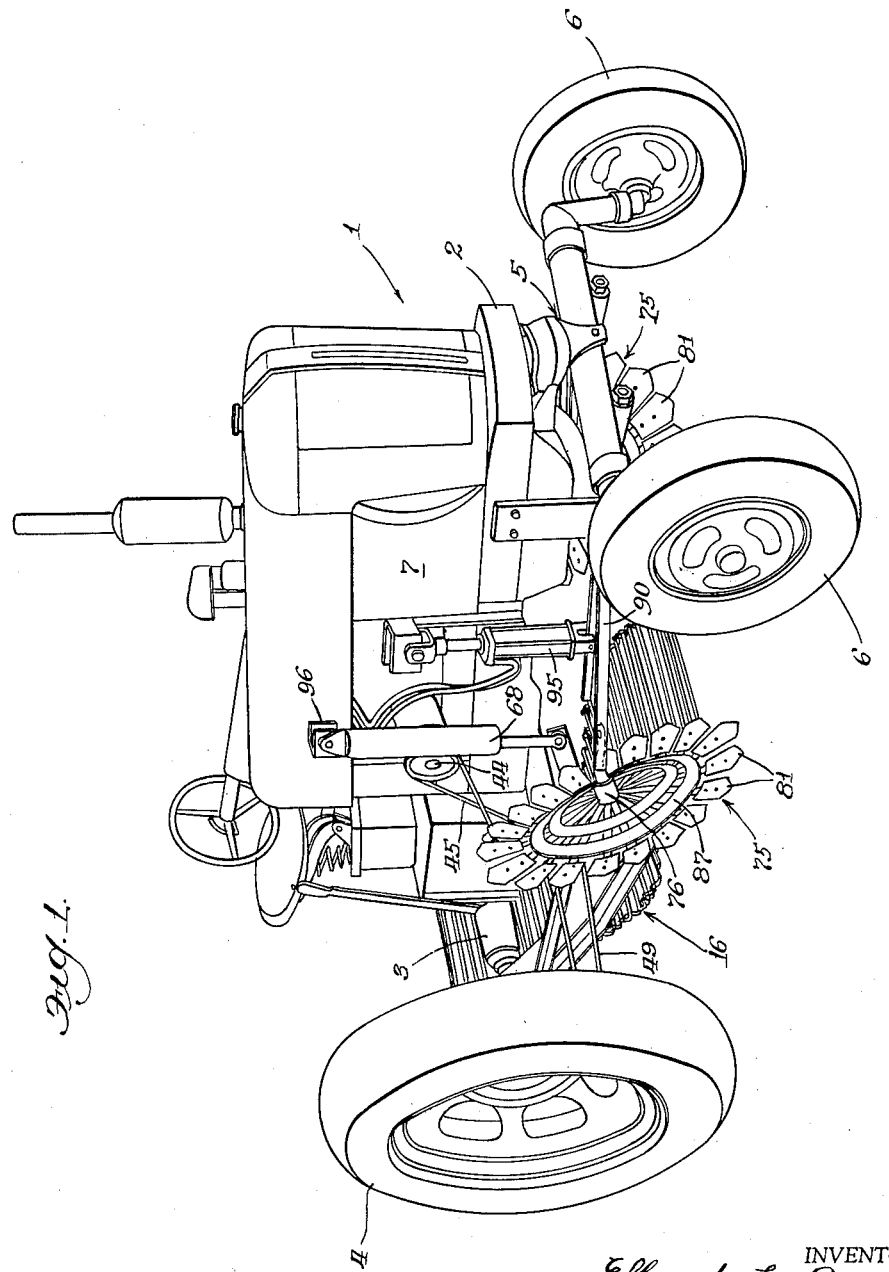
FIGURE 1 is a perspective view of a preferred form of the invention in operating position.
Figure 2:
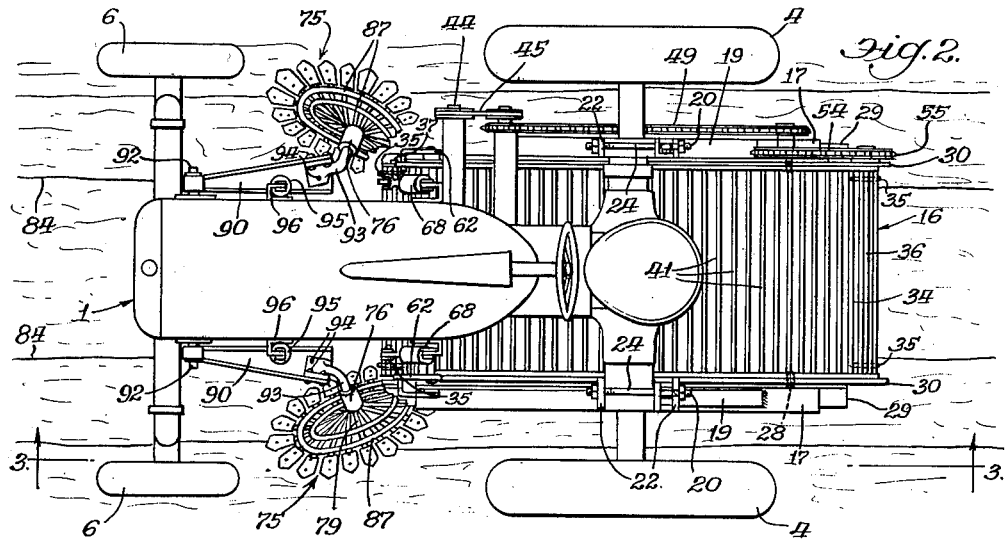
FIGURE 2 is a top plan view thereof.
Figure 3:
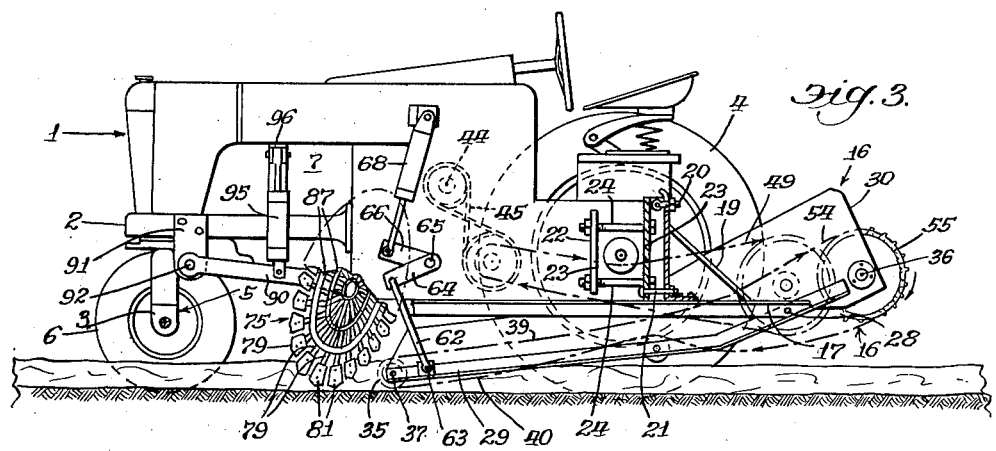
FIGURE 3 is a sectional view of the same taken along line 3—3 of FIGURE 2 and in the direction of the arrows.
Figure 4:
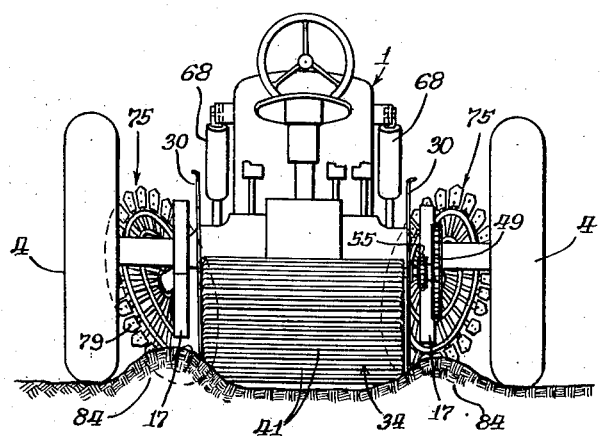
FIGURE 4 is a rear elevational view of the same.

Referring to the drawing figures in detail, the reference character 1 generally denotes the basic supporting structure for the crop handling portions of the digger device including means for propelling the same. This supporting structure comprises the chassis of a farm type tractor, which chassis includes the longitudinally extending main frame or support means 2 and rear axle housing 3 together with the running gear of the tractor comprising the rear wheels 4 and a front truck assembly 5 with its wheels 6 and the engine 7 and other parts necessary to propel the tractor, all of which may be conventional and will not be dealt with further.

Considering the crop handling portions of the device, an apron type conveyor generally designated 16 is provided. This conveyor comprises a pair of longitudinally extending angle iron members 17 to each of which is attached by welding a support structure consisting of a vertically extending standard 18 and a diagonal brace element 19. Each standard 18 is attached by means of bolts 20 and 21 to one side of a rear axle attaching frame 22 which is non-rotatably secured to the rear axle housing 3 of the tractor portion by means of bolts 24, engaging the housing at each side along a vertically extending flat surface or pad 23. Pivotally supported at the rear of each of the members 17 at 28 and inwardly of the members is a longitudinally extending angle iron side member 29 above which extends a plate 30 suitably secured thereto together which form each side of the apron conveyor 16.

Positioned between the sides 29, 30 is an endless conveyor 34 supported for endless movement on a pair of sprockets 35 at the front and rear supported in turn on shafts 36 and 37 which are received in the side member 29. The endless conveyor 34 comprises upper and lower runs 39 and 40, respectively, and consists of spaced laterally extending rod-like elements 41 suitably attached at each side for articulated movement around the sprockets at each end. The conveyor is driven from the power take-off 44 of the tractor engine through the sheave and belt drive 45 and the gear and sprocket drive 49, undergoing a gear reduction through the additional sprocket and chain drive 54, the sprocket 55 of the latter being supported on the same shaft 36 as the rear sprockets 35 of the conveyor. The entire conveyor structure is pivotally raisable and lowerable about its axis at 28 by means of links 62 each suitably attached at one end at 63 to the front of the respective conveyor side members 29 and 30 and at the other end to an arm 64 which is secured to a rockshaft 65, which shaft is rotated by arms 66 under the action of hydraulic cylinders 68 suitably supported on the chassis of the tractor. These cylinders are simultaneously operated by suitable and conventional means, not shown, controllable by the operator of the tractor. The conveyor is not only adjustable for and during the digging operation of the device but is also entirely removable from the ground by the hydraulic means into a shipped or carried position.

The potato digging means of this device comprises a pair of rotatable digger wheels generally designated 75, the centers 76 of which are forward of the conveyor 16 and respectively to each side of the latter, the wheels slightly overlapping the conveyor at each side thereof. Each of the digger wheels comprises a plurality of elongated, radially extending arms 79 at the outer end of each of which is suitably secured a generally sharp-pointed spade-like digging element 81. The elements of each wheel are adapted to successively move across the respective rows 84 of potatoes, digging out the potatoes towards the center between the rows for reception by the endless conveyor 34. Although normally the potatoes and excavated earth are placed in the path of the conveyor for subsequent picking up of the same, some of the potatoes are occasionally actually deposited on the conveyor from time to time.

It is pointed out that as the digger elements cut through the earth the latter is turned over placing the potatoes on or near the top with a cushioning blanket of earth below the potatoes for protection as they are moved over the ground toward the center between the rows and as they are being moved onto the conveyor.

It is also pointed out that the earth is broken up by the digging elements and that only enough earth is removed to extract the potatoes. This makes later separation of the earth from the potatoes much easier and quicker. It is also important that stones and rocks found in plentiful numbers in the fields of northern Maine, for instance, will not affect the present device, the stones or rocks being successively and individually moved in turn by the rotating elements. This is in sharp contrast to the blade type of digger when they run head on into one or more stones or rocks to become stuck or damaged. It will also be recognized that inasmuch as the rotating digger elements successively cut up and extract only enough earth to remove the potatoes, much less power is expended than in the case of the prior art blade in scoop type of digger which removes the earth between and below the adjacent rows as well as in the rows to assure a deep enough cut to extract the potatoes from both rows without injury and this being done in one large and continuous cut.

The axes of the digger wheels on which the centers of the wheels are located and about which the elements 81 rotate converge in the forward direction of the device. This arrangement allows each of the digger elements to be self-moving through the earth by engagement with the earth and to move the following digger elements into the earth in turn for self-movement, thus to produce self-turning of each of the digger wheels as the device is moving along the rows of crop during the digging operation. This also produces a substantial savings of power.

Also, the axes are upwardly inclined in the forward direction of the device producing a rearward tipping of each of the wheels from the bottom so as to allow the digger elements to get under a certain amount of the earth and at least partially under the potatoes as they cut across the rows. It is further mentioned that the spaced relation of the digger elements and the radial arm arrangement allows a certain sifting out of the earth as the elements move across the rows. The open work or spider web type of construction of the interior portions of the wheels produced by the radial arms 79 and the annular supporting bands 87 further allow any captured earth to fall or sift therethrough. The convex nature of the radiating arms 79 as viewed from the front together with the annular bands 87 further prevent earth from piling up or collecting on the center portions of the wheels.

Each of the digger wheels 75 is mounted to the tractor chassis by means of an inwardly and outwardly flanged triangular shaped plate member 90 pivotally supported at the front on a pin 92 extending from the lower end of a hanger 91 secured to the main support of the chassis by suitable means such as by welding. Each of the digger wheels is actually supported on a bent shaft 93 by suitable means, said shaft being secured to its triangular plate 90 as by rivets at 94. Each of the digger assemblies so mounted to the chassis is pivotal upwardly and downwardly about the pins 92 by means of a hydraulic cylinder 95 of conventional construction suitably attached at the top to the tractor chassis at 96. These cylinders are actuatable by means, not shown, which are controlled by the operator of the tractor. It is thus seen that each of the digger wheels 75 is individually raisable and lowerable to the desired digging depth by the operator of the device as the same is moving along the rows of crop during the digging operation. It is pointed out in this connection that potatoes in different rows often mature at different depths and indeed the potatoes in a single row are not all necessarily at the same depth but may vary considerably in different parts of the row. It is thus seen that this individual adjustment is very important to avoid injury to the potatoes while at the same time not digging deeper than reasonably necessary so as to waste considerable power. It is also important to note that the crop handling parts including the digger elements are below the operator where they are easily observable and adjustable for the desired operation. It is also important that a very wide range of individual adjustment is provided each of the digger wheels by this arrangement, unlike any prior art device known, and that the individual wheels can be raised completely off the ground for a shipped or carried position during movement of the device while away from the rows.

Although the present invention has been described in connection with a potato digger, the principles of the invention may also be applied to what is known in the industry as a potato harvester in which additional provision is had for sorting out of the potatoes after the original digging. Such a device is intended to be included within the term "potato digger." Additionally, though the present invention is especially intended and particularly adapted to the digging of the fragile potato crop, the device may also be employed for the digging of root crops other than potatoes, if desired. Further still, constructions embodying all or certain concepts of the invention may not necessarily be restricted to the digging out of crop in all cases.

Although a specific illustrative construction has been shown and described it is not desired to be limited to that construction, the broader aspects of the invention being imbodiable in other constructions which are desired to be included within the terms of the appended claims as applicable.

What is claimed is:

1. In combination with a tractor having a longitudinally oriented frame; potato digging means underslung relative to said tractor; said potato digging means including a pair of digger supports each pivotally connected to opposite sides of said frame and extending contiguously thereto; power means mounted on said tractor for selectively pivoting said digger supports; a pair of shafts each mounted on respective digger supports and extending therefrom transversely relative to said frame at an acute angle both horizontally and vertically relative to the longitudinal axis of said frame; and a pair of digger wheels each rotatably mounted on respective shafts.

2. In combination with a tractor having a longitudinally oriented frame and a rear transverse axle; potato digging means underslung relative to said tractor; said potato digging means including a pair of digger supports each pivotally connected to opposite sides of said frame and extending contiguously thereto; first power means mounted on said tractor for selectively pivoting said digger supports; a pair of shafts each mounted on respective digger supports and extending therefrom transversely relatively to said frame at an acute angle both horizontally and vertically relative to the longitudinal axis of said frame; a pair of digger wheels each rotatably mounted on respective shafts; endless conveyor means pivotally connected to said axle and extending longitudinally relative to said frame; and second power means mounted on said tractor for pivoting said conveyor means vertically relative to the longitudinal axis of said frame.

3. The invention according to claim 2; said conveyor means including a pair of longitudinally spaced rotatably mounted rods; and a plurality of spaced laterally extending conveyor elements loosely secured at each end thereof to form an endless conveyor; said conveyor being mounted for movement about said rods as said rods rotate; said tractor having means for rotating at least one of said rods.

4. The invention according to claim 3; each of said digger wheels having a plurality of spaced arms extending radially in a convex pattern from said shaft; said arms being interconnected by concentric annular bands; and a plurality of sharp-pointed digging elements secured to the periphery thereof so as to engage and be rotated by the ground as the tractor moves.

5. The invention according to claim 1; each of said digger wheels having a plurality of spaced arms extending radially in a convex pattern from said shaft; said arms being interconnected by concentric annular bands; and a plurality of sharp-pointed digging elements secured to the periphery thereof so as to engage and be rotated by the ground as the tractor moves.

6. The invention according to claim 2; each of said digger wheels having a plurality of spaced arms extending radially in a convex pattern from said shaft; said arms being interconnected by concentric annular bands; and a plurality of sharp-pointed digging elements secured to the periphery thereof so as to engage and be rotated by the ground as the tractor moves.

7. A digger adapted for use with a tractor having a longitudinal axis; said digger including a pair of elongated digger supports each adapted to be pivotally connected to opposite sides of said tractor and extend axially contiguously thereto, first power means for selectively pivoting said digger supports; a pair of shafts each mounted on respective digger supports and extending therefrom at an acute angle relative to the axis thereof; a pair of digger wheels each rotatably mounted on respective shafts; endless conveyor means adapted to be axially pivotally underslung by said tractor and extend longitudinally relative thereto; and second power means for pivoting said conveyor means.

8. The invention according to claim 7; each of said digger wheels having a plurality of spaced arms extending radially in a convex pattern from said shaft; said arms being interconnected by concentric annular bands; and a plurality of sharp-pointed digging elements secured to the periphery thereof so as to engage and be rotated by the ground as the tractor moves.

9. The invention according to claim 7; said conveyor means including a pair of longitudinally spaced rotatably mounted rods and a plurality of spaced laterally extending conveyor elements loosely secured at each end thereof to form an endless conveyor; said conveyor being mounted for movement about said rods as said rods rotate; and means adapted to transmit power from said tractor to said conveyor means for rotating at least one of said rods.

10. The invention according to claim 7; said first power means including a pair of hydraulic rams each connected with a respective digger support and each individually operable to pivot its associated digger support whereby the depth of cut of each digger wheel may be individually adjusted.

References Cited in the file of this patent

UNITED STATES PATENTS

| 1,298,169 | Brown | Mar. 25, 1919 |
| 2,766,576 | Van der Lely | Oct. 16, 1956 |
| 2,845,769 | Hintz et al. | Aug. 5, 1958 |

FOREIGN PATENTS

| 395,107 | Germany | May 15, 1924 |